March 18, 1924.  1,487,514

H. T. GOSS

READING APPLIANCE FOR SCALES

Filed Dec. 19, 1919  5 Sheets-Sheet 1

Inventor
Harry T. Goss
By his Attorneys

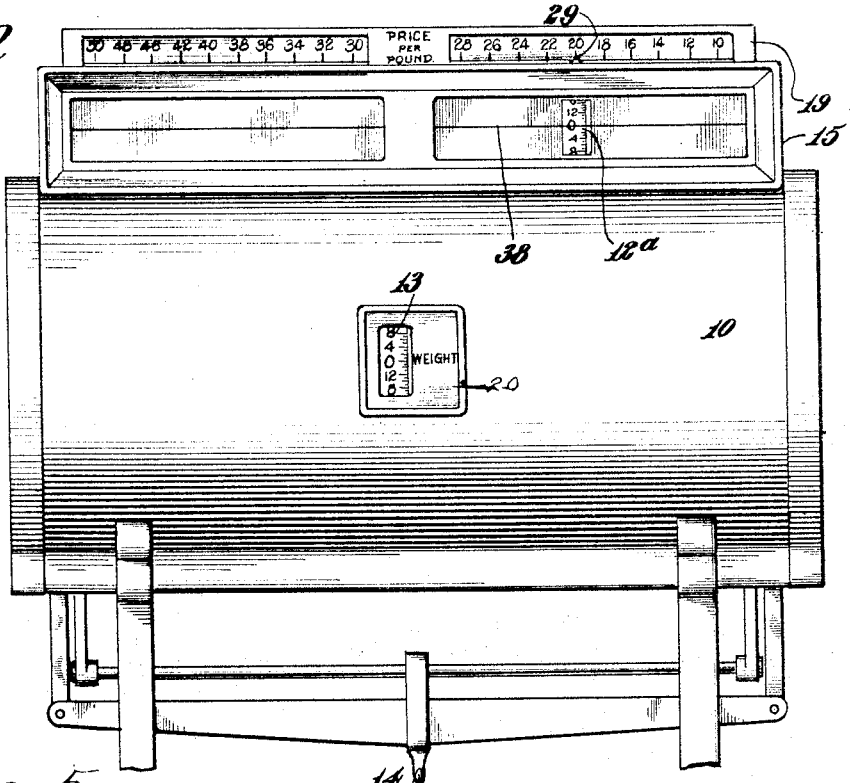
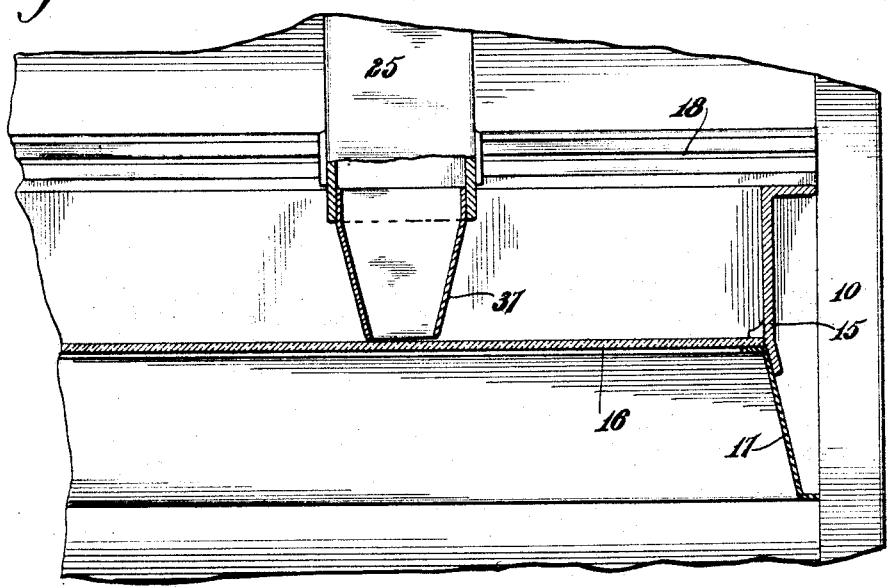

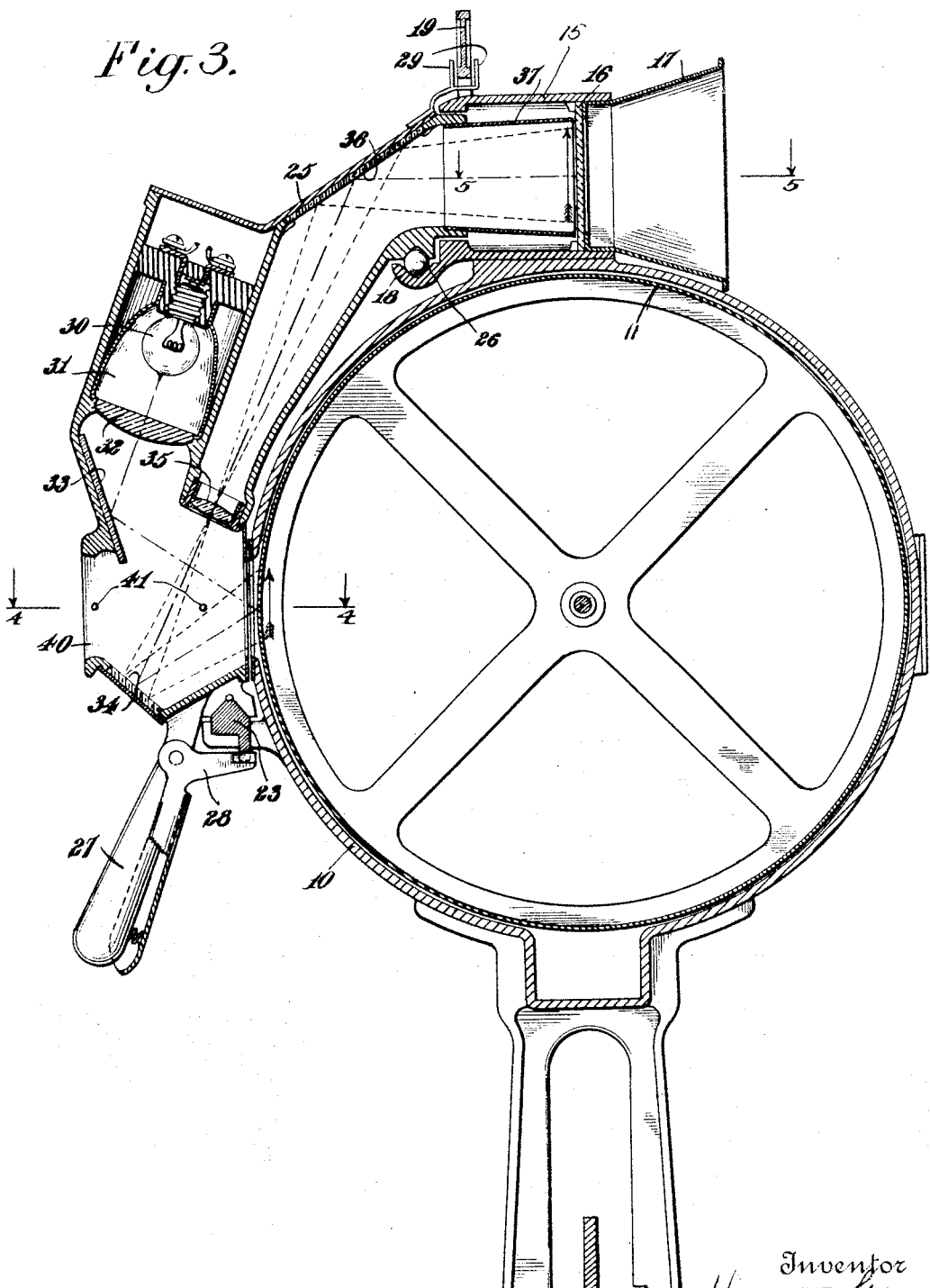

March 18, 1924.
H. T. GOSS
READING APPLIANCE FOR SCALES
Filed Dec. 19, 1919

Inventor
Harry T. Goss,
By his Attorneys
Kerr, Page, Cooper & Hayward

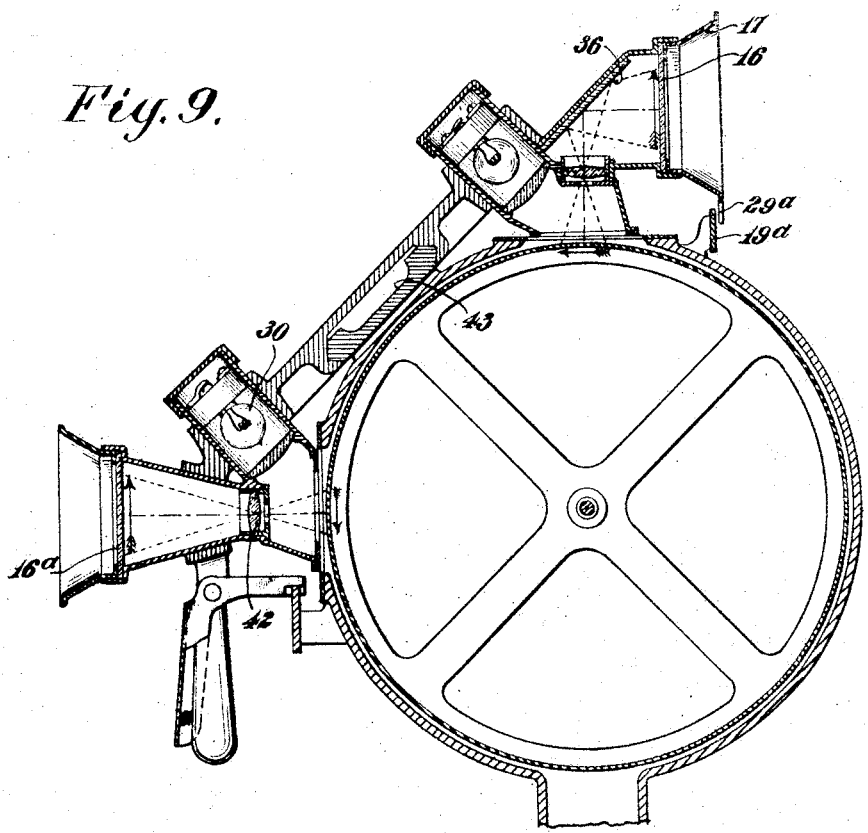

Patented Mar. 18, 1924.

1,487,514

UNITED STATES PATENT OFFICE.

HARRY T. GOSS, OF RUTHERFORD, NEW JERSEY, ASSIGNOR, BY MESNE ASSIGN-
MENTS, TO DAYTON SCALE COMPANY, OF DAYTON, OHIO, A CORPORATION OF NEW
JERSEY.

READING APPLIANCE FOR SCALES.

Application filed December 19, 1919. Serial No. 346,142.

*To all whom it may concern:*

Be it known that I, HARRY T. GOSS, being a citizen of the United States, residing at Rutherford, county of Bergen, and State of New Jersey, have invented certain new and useful Improvements in Reading Appliances for Scales, of which the following is a full, clear, and exact description.

In the scale art, particularly with computing scales, it has been the practice to use a drum which is proportionally moved by the scale in accordance with the weight thereon. This drum carries upon its periphery a number of graduated number scales each scale corresponding to a particular price per unit as per pound. The graduations of each scale is such as to disclose opposite a reading line the computed cost corresponding to a given price and weight. The size of the drum is extremely limited on account of the low inherent power of the scale. For this reason the scales of computed prices have necessarily been made with minutely spaced graduations and have been difficult to read. Certain computing scales have been provided with a chart having a double row of scales to permit reading of the weight and price data at the back and front of the drum by both customer and clerk. These scales have further condensed the scale sizes particularly in width. Magnifying glasses have been utilized to a certain extent and also electric illuminating devices. However suitable these devices have been for the clerk's reading, they have not obviated one defect which is that the reading of the amount by the customer has been difficult unless the customer could take a position directly in front of and close to the scale. This has not always been possible due to the location of the scale and reading of the amount, both by the customer and the clerk, has been unsatisfactory.

The present invention has for its object the provision of a scale reading device which will minimize, if not entirely obviate, the difficulties previously encountered.

In the drawings,

Fig. 2 shows the opposite or customer's side of the scale equipped with my appliance.

Fig. 3 shows a sectional view of the drum and reading appliance.

Fig. 5 is a detail view taken on line 5—5 of Fig. 3.

Fig. 9 shows a sectional view of another modification.

Figure 1:
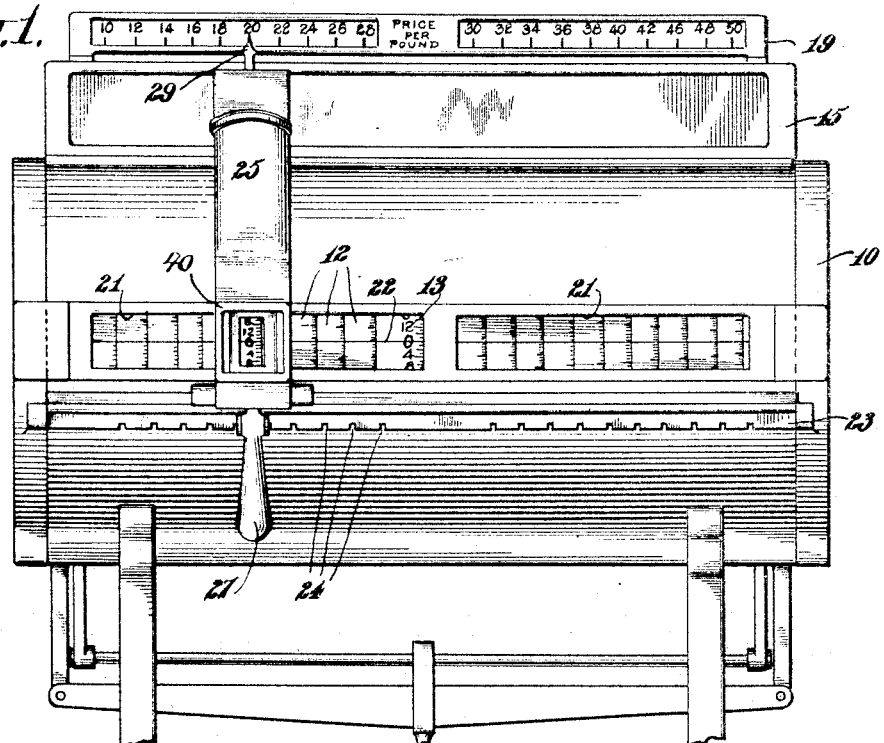
Fig. 1 shows the rear or clerk's side of a scale drum equipped with my improved reading appliance.
Figure 4:
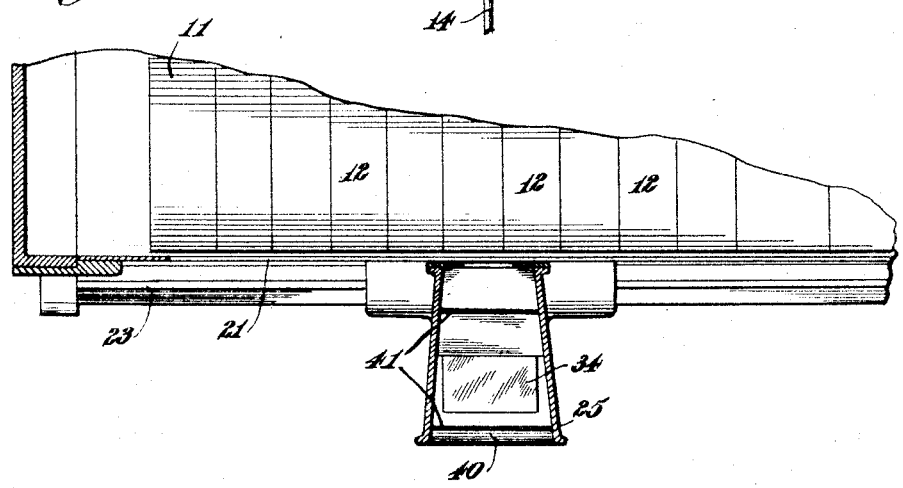
Fig. 4 shows a sectional view taken on line 4—4 of Fig. 3.

In more detail, the usual pedestals support a chart housing 10 in which is rotatably mounted an indicating drum 11, which carries on its periphery a chart having thereon a plurality of number or computed price scales 12 and a weight scale 13. The drum is operated in any desired manner from draft rod 14. At the top of the chart housing is fixed a longitudinally extending box 15, which is open at the rear (see Fig. 3) and closed at the front by a ground glass plate 16 retained therein in any suitable manner. At the front of the glass I provide a flared metal open faced member 17 (see Figs. 3 and 5). The lower rear edge of box 15 is extended and shaped to form a shaped guide way 18. At the top of the box at the ends are brackets which form a support for a price per pound scale 19. This scale is graduated in such a way that the price per pound marks align with the corresponding scale 12 on drum 11, and these price per pound graduations or marks are provided on both sides of scale 19 as shown in Figs. 1 and 2.

The front of the chart housing is provided with a reading opening 20, which is opposite the weight scale 13. The rear of the chart housing is also provided with two rectangular openings 21. The rectangular openings extend entirely across the chart and provide a reading aperture for both price scales 12 and reversed weight scale 13. Below the lower edge of rectangular openings 21 the chart housing is provided with two brackets which extend outwardly therefrom and form a support for a member 23 shaped at its upper surface to form a V-guide rail and having its lower surface notched with a plurality of notches 24. There is one notch for each price scale and the notches are disposed substantially opposite the center of these scales.

A casing 25 in the form of a hollow casting has a lower extension shaped to fit over the guide 23 and also carries a ball 26 which fits in the guide 18 as clearly shown in Fig. 3. The casing 25 can be slid longitudinally along the guide rails by means of a handle 27 which is provided with a suitable latch 28 adapted to cooperate with notches 24 and thereby retain the casing with its center line opposite any desired price per pound. A suitable double pointer 29 is fastened to the casing and indicates the price per pound on scale 19, both at the front and rear.

Within a compartment of the casing I provide an electric bulb 30 having a suitable reflector 31, which reflects the light rays through a condensing lens 32, thereby forming a beam of light which is directed to a mirror 33 which reflects the beam of light directly upon a particular price scale 12. The image of the number or price scale thus illuminated is in turn reflected by a mirror 34 through a magnifying lens 35 to a mirror 36 which, in turn, reflects the image through the open front of casing 25 on to a reading screen which preferably is a ground glass as shown at 16. In order to prevent leakage of light the front and upper end of casing 25 terminates within the box 15 and is provided with a tapered tube 37 which extends close to the ground glass 16, as shown in Fig. 5. The image of a section of the price scale is reflected upon the reading screen 16 and visible to the customer, as clearly shown at 12ª in Fig. 2. The ground glass 16 is provided with a reading line 38 and the customer by reading the intersection of the reflected computed price image and this reading line can readily read the computed price or number. By a proper design of lenses this reading image can be magnified to any desired degree, thereby facilitating the reading.

In order that the clerk may read the corresponding price, I provide an open front 40 for casing 25. A pair of cross wires 41 are carried by casing 25 suitably located out of the path of the beam of light, in order to avoid the reflection of the image of these wires. By aligning the eye with these two wires the clerk may read directly the image of the price scale 12. In order that the weight scale 13 may be read by the clerk, I provide a cross-wire 22 supported in any suitable manner as by the plate in which the openings 21 are made.

Figure 6:
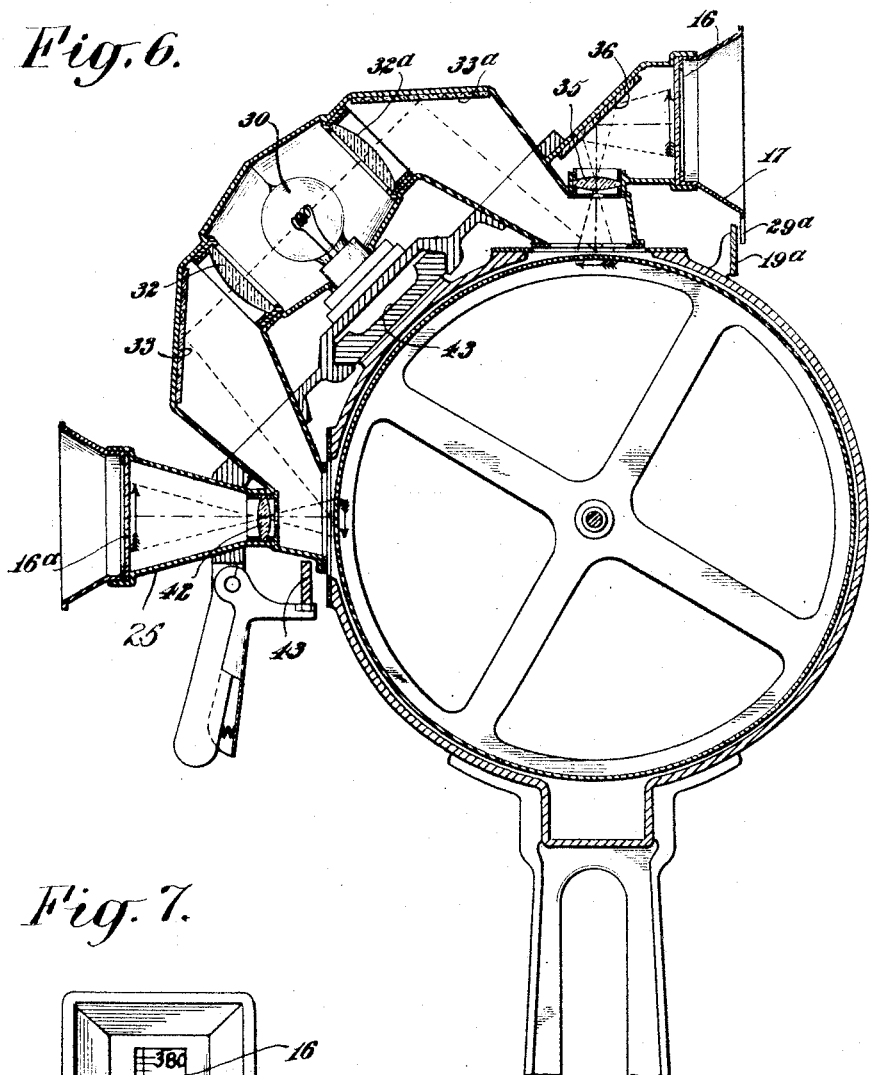
Fig. 6 shows a sectional view of a modified form having two magnified readings.
Figure 7:
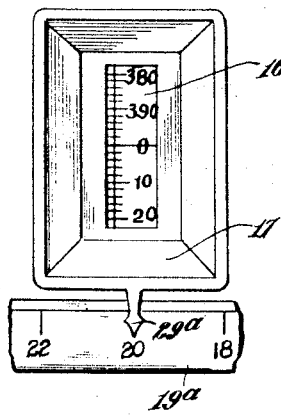
Fig. 7 shows the reading of computed cost and price per pound as it appears to the customers.
Figure 8:
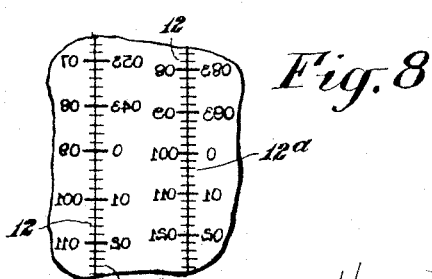
Fig. 8 shows an enlarged view of the price scales used with the form illustrated in Fig. 6.

In the form shown in Fig. 6 I employ a drum having for each price two sets of price scales 12 and 12ª arranged side by side as shown in Fig. 8 and reversed and displaced with respect to each other. Casing 25 is provided with two lenses 32 and 32ª and two mirrors 33 and 33ª which reflect the beams of light from bulb 30 to the price scale 12 at the rear of the drum and to reversed price scale 12ª at the top. The image of scale 12 passes through a magnifying lens 42 to a ground glass 16ª having the usual reading line. The image of scale 12ª passes through a magnifying lens 35 to a reflecting mirror 36 which reflects the image upon the ground glass 16. The flare tube 17 carries the pointer 29ª which cooperates with the price per pound scale 19ª which is fastened directly the drum (see Figs. 6 and 7). The casing 25 slides upon a unitary guide rail 43 and is latched in any desired position in a manner similar to the construction heretofore employed.

In the form shown in Fig. 9 a similar principle is employed and the construction is in many respects similar to that shown in Fig. 6. In this form, however, I employ two sources of illumination, namely bulbs 30 and 30ª.

The method of supplying electricity to the bulbs and controlling the flow when the scale is inactive has not been described herein. Any well known form of circuit controller may be used, such as the one shown in the Bane and Crain Patent No. 937,573, patented October 19, 1909.

My invention has various applications which will not be set forth herein. It is particularly adaptable for the displaying of any data carried by a drum and where it is desired to display the data at an angle to the direct display of the data by the drum itself. The displayed data may or may not be magnified as desired.

While I have several forms of my invention, it will be understood that I do not limit my invention to the particular details of construction shown and described. What I claim as my invention is particularly pointed out in the appended claims.

What I claim is:

1. In a device of the class described, in combination, a plurality of adjacent numbered scales arranged side by side and adapted to be moved in unison, a reading device therefor, said device comprising a source of light, means for selectively directing the light rays upon any desired number scale by the manipulation of said reading device, means for reflecting the image of the selected illuminated scale and a reading screen upon which the image is displayed.

2. In a device of the class described, in combination, a weight-controlled rotatable drum; a number scale upon the periphery of said drum; and means for rendering predetermined portions of said number scale visible from both the front and rear of said drum; the last mentioned means comprising a casing having means therein for supplying a beam of light and for directing the rays upon the number scale, and means in said casing for reflecting the image of the scale and for displaying the said image at the opposite side of the drum from which the image is first reflected.

3. In a device of the class described, having, in combination, a plurality of adjacent movable number scales, a reading device therefor, said device comprising a source of light, means for selectively directing the light rays upon any selected scale, means for reflecting and magnifying the image of the selected number scale and means for indicating the number scale which is selected and reflected.

4. The invention set forth in claim 3 in which the means for indicating the selected number scale is adapted to indicate the selected scale at both sides of the device.

5. In a computing scale, in combination, a chart housing, a rotatable drum therein having a price chart upon its periphery, said chart including a plurality of price scales, a casing slidable upon the housing and adapted to be placed in alignment and retained opposite any desired price scale, a source of light in said casing, means for directing a beam of light upon a particular price scale, means for reflecting the image of a section of said price scale through said casing, and means for displaying said image upon a reading screen.

6. The invention set forth in claim 5 in which means is provided for magnifying the image as it is reflected through the casing.

7. The invention set forth in claim 5 in which means for reflecting the image of the price scale is adapted to reflect said image in a different direction from the direction of the initial display of the scale upon the drum.

8. The combination with the invention specified in claim 5 of means for indicating the price per pound corresponding to the particular price scale whose image is thrown upon the screen.

9. In a computing scale, a rotatable drum, a price chart thereon, a chart housing, guide rails on said housing, a hollow casing slidable on said rails, a lamp having a reflector in said casing, a lens for said lamp, a light reflecting mirror adapted to direct the beam of light from said lens to said chart, an image reflecting mirror adapted to reflect the image of a particular section of the chart, a magnifying lens, a second image reflecting mirror and a reading screen adapted to receive the reflected magnified image and display the same.

10. In a computing scale, in combination, a price and weight chart, means for displaying at one side of the scale a section of the price chart and the weight chart, means for displaying at the opposite side of the scale the weight chart and means for displaying at said opposite side of the scale a reflected image of the section of the price chart which is visible at the other side of the scale.

11. A device for reading numerical data carried by a drum comprising, in combination, means for directing a beam of light on said data on the drum, means for reflecting the image of the desired data through an angle so as to display the image in a different direction from the original direct display of data by the drum, means for magnifying the image thus reflected and for reading the magnified image and means for reading the data displayed by the drum at the opposite side thereof relatively to the display of the magnified reflected image.

12. A weighing scale comprising in combination, a plurality of weight-controlled number scales, manually controlled means for illuminating any desired one of said scales, and means comprising a movable optical device for selectively and distinctively disclosing a magnified image of any selected one of said number scales.

13. A computing scale comprising in combination, a weight-actuated device, a rotatable chart having a plurality of sets of indications, manually controlled means for selectively controlling the visibility of said sets of indications, means controlled by said device for selecting a portion of any selected set of said indications in accordance with a function of the weight of a commodity, a screen, and means for displaying an image of the selected portion of the selected set of indications upon said screen.

14. A computing scale comprising in combination, a weight-actuated device, a rotatable chart having a plurality of sets of indications, manually controlled means for selectively controlling the visibility of said sets of indications, means controlled by said device for selecting a portion of any selected set of said indications in accordance with a function of the weight of a commodity, a screen, means for displaying an image of the selected portion of the selected set of indications upon said screen, and means for indicating which of the sets of indications has been selected.

15. A weighing scale comprising in combination, a rotatable chart having a plurality of sets of indications, a screen, and means including a manually settable device and a weight-actuated device for displaying upon said screen a portion of any one, but only one, of said sets of indications in accordance with the weight of a commodity.

16. A weighing scale comprising in combination, a rotatable chart having a plurality of sets of indications, a screen, and means including a weight-actuated device for displaying upon said screen a portion of any one, but only one, of said sets of indications in accordance with the weight of a commodity.

17. A computing scale comprising, in combination, a load-actuated draft rod; a rotatable chart having a plurality of sets of indications; manually operable means for selectively controlling the visibility of said sets of indications; a screen, and means controlled by said draft rod for distinctively disclosing, upon said screen, a portion of any selected set of said indications in accordance with a function of a weight of a commodity.

18. In a weighing scale, in combination, a weight-controlled movable chart having a plurality of series of graduations, a screen, and means for selectively projecting graduations from each of said series upon said screen.

In testimony whereof I herewith affix my signature.

HARRY T. GOSS.